(12) United States Patent
Shin

(10) Patent No.: US 6,408,685 B2
(45) Date of Patent: Jun. 25, 2002

(54) METHOD AND SYSTEM FOR MEASURING INTERFERENCE BETWEEN VALVE AND PISTON OF AN INTERNAL COMBUSTION ENGINE

(75) Inventor: Dalheun Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/848,228

(22) Filed: May 4, 2001

Related U.S. Application Data

(62) Division of application No. 08/950,492, filed on Oct. 15, 1997.

(30) Foreign Application Priority Data

Oct. 15, 1996 (KR) .............................................. 96-45888
Oct. 15, 1996 (KR) .............................................. 96-45889

(51) Int. Cl.[7] .............................. G01L 3/26; G01L 5/13; G01M 15/00
(52) U.S. Cl. ...................................................... 73/116
(58) Field of Search ........................... 73/116, 660, 765, 73/117.3, 136 A; 123/436, 90.17, 478

(56) References Cited

U.S. PATENT DOCUMENTS

| | | | |
|---|---|---|---|
| 3,710,618 A | * | 1/1973 | Pagel ........................ 73/136 A |
| 3,847,017 A | * | 11/1974 | Watts ....................... 73/88.5 R |
| 4,301,678 A | | 11/1981 | Full et al. |
| 4,805,571 A | * | 2/1989 | Humphrey ................... 123/316 |
| 5,016,593 A | | 5/1991 | Takaoka |
| 5,251,590 A | | 10/1993 | Faletti et al. |
| 5,269,178 A | | 12/1993 | Vignmstad et al. |
| 5,365,787 A | * | 11/1994 | Hernandez et al. ........... 73/660 |
| 5,463,898 A | * | 11/1995 | Blander ....................... 73/116 |
| 5,850,812 A | | 12/1998 | Noguchi |

* cited by examiner

Primary Examiner—Benjamin R. Fuller
Assistant Examiner—Octavia Davis
(74) Attorney, Agent, or Firm—Birch, Stewart, Kolasch & Birch, LLP

(57) ABSTRACT

A method for measuring interference between a valve and a piston, includes the steps of measuring a standard torque value, related to camshaft distortion caused by engine RPM, through voltage detecting means; measuring torsional distortion deviation of a crankshaft and an injection pump shaft by fixing the camshaft and forcibly rotating the crankshaft by said standard torque value; measuring vibration generated when the camshaft, the crankshaft, and the injection pump shaft are rotated, and measuring a crankshaft rotational angle to detect a piston TDC position, both measurements being conducted at a predetermined level of engine RPM; displaying piston and intake/exhaust valve movement on a graph at the piston TDC position after analyzing torsional distortion deviation and vibration of each shaft; and determining whether there is interference between the intake/exhaust valve and the piston by comparing design values with that displayed on the graph.

9 Claims, 5 Drawing Sheets

METHOD AND SYSTEM FOR MEASURING INTERFERENCE BETWEEN VALVE AND PISTON OF AN INTERNAL COMBUSTION ENGINE

This application is a divisional of co-pending Application No. 08/950,492, filed on Oct. 15, 1997, the entire contents of which are hereby incorporated by reference and for which priority is claimed under 35 U.S.C. § 120; and this application claims priority of Application Nos. 96-45888 and 96-45889 filed in Korea on Oct. 15, 1996 under 35 U.S.C. § 119.

FIELD OF THE INVENTION

The present invention relates to a measuring system for an engine of a vehicle, and more particularly, to system and method for measuring interference between an intake/exhaust valve and a piston.

BACKGROUND OF THE INVENTION

Generally, an engine for generating drive power of a vehicle includes a piston, undergoing rectilinear movement inside a cylinder, and an intake valve and exhaust valve provided in a cylinder head. A connecting rod is attached at one and to the piston and at another end to an offset portion of a crankshaft such that the force of the piston is transferred to the crankshaft to rotate the same, thereby converting the reciprocating motion of the piston to rotary motion of the crankshaft.

The crankshaft outputs rotational power to a transmission in accordance with a clutch operation and rotates a camshaft through a timing belt. The intake and exhaust valves are opened and closed by the rotating camshaft to supply fuel and exhaust combustion gas.

The camshaft is driven at one-half the speed of the crankshaft, the camshaft and crankshaft being connected by the timing belt.

Each of the above elements of the engine has its own inherent rigidity and can experience distortion from a variety of factors including inertia, and load and torque from power transmission. With regard to the camshaft, as one end in rotatably supported while another end receives rotational force, load distribution in an axial direction along the camshaft is not even such that the same can become twisted.

Such distortion of the camshaft changes both the duration of opening and stroke of the intake and exhaust valves such that interference between the valves and piston results, a main cause of engine trouble.

As there is no prior art which precisely measures such distortion of the elements of the engine including the camshaft, it is difficult to obtain data to correct the problem of interference between the exhaust and intake valves and piston by making adjustments.

SUMMARY OF THE INVENTION

The object of the present invention is to provide a method and system for measuring interference between an intake/exhaust valve and a piston in which a torque value, causing distortion of rotating shafts; torsional deviation, generated when torque is transmitted to each rotating shaft, of each shaft; and rotational vibration, generated by distortion of each shaft and tension and rigidity of a timing belt are measured to calculate interference between the intake/exhaust valve and the piston such that the problem of interference can be rectified in the designing process.

To achieve the above object, the present invention provides a method for measuring interference between a valve and a piston, comprising the steps of measuring a standard torque value, related to camshaft distortion caused by engine RPM, through voltage detecting means; measuring torsional distortion deviation of a crankshaft and an injection pump shaft by fixing the camshaft and forcibly rotating the crankshaft by said standard torque value; measuring vibration generated when the camshaft, the crankshaft, and the injection pump shaft are rotated, and measuring a crankshaft rotational angle to detect a piston TDC position, both measurements being conducted at a predetermined level of engine RPM; displaying piston and intake/exhaust valve movement on a graph at the piston TDC position after analyzing torsional distortion deviation and vibration of each shaft; and determining whether there is interference between the intake/exhaust valve and the piston by comparing design values with that displayed on the graph.

The voltage detecting means is comprised of a strain gauge.

The strain gauge is provided on the camshaft at locations where distortion from power transmission is most severe.

The torsional distortion deviation is derived from measuring a distortion angle through use of protractors provided on sprockets of the crankshaft and the injection pump shaft.

The torsional distortion deviation is derived from measuring the torsional distortion deviation of the crankshaft by fixing the injection pump shaft and forcibly rotating the crankshaft.

The measuring of vibration is performed using a torsional vibration meter.

A system for measuring interference between a valve and a piston including first angle detecting means for detecting a rotating angle of a crankshaft; and second angle detecting means for detecting a rotating angle of an injection pump shaft, whereby the first and second angle detecting means measure torsional distortion deviation of a crankshaft and an injection pump shaft when torque, equaling camshaft distortion torque measured with the camshaft in a fixed state, is given either to the crankshaft or the injection pump shaft, the system being applied to an engine where the crankshaft, injection pump shaft, and the camshaft are connected through power transmission means.

The measurement of the camshaft distortion torque is measured by strain gauges provided at location on the camshaft where distortion, caused by torque from power transmission, is most severe.

The strain gauge comprises four resistors connected to each other through a Wheatstone bridge having first and second output terminals, and the system further comprising a first signal processor for processing signals output from the first output terminal of the Wheatstone bridge; a second signal processor for processing signals output from the second output terminal of the Wheatstone bridge; and a controller for analyzing signals from the first and second output terminals to determine camshaft distortion, and calculating standard torque from the determined camshaft distortion value and outputting the same.

A system for measuring interference between a valve and a piston, comprising reflective tape adhered to an outside circumference of sprockets of each shaft, the reflective tape made of material to enable the reflection of light; torsional vibration detecting means for emitting light toward each sprocket of each rotating shaft, receiving the reflection of this light, reflected by the reflective tape, and for outputting vibration of each shaft as an AC component signal; amplifying means for amplifying said output AC component signal; crankshaft angle detecting means for detecting crankshaft rotational angle from the crankshaft sprocket; recording means for storing, in a predetermined format, piston position information and AC component signals related to the vibration of each shaft; and waveform display means for graphically displaying said information of piston position and AC component signal relating to vibration of each shaft.

The crankshaft angle detecting means performs a photo interrupting process on gear teeth of the crankshaft sprocket.

BRIEF DESCRIPTION OF THE DRAWINGS

Further objects and other advantages of the present invention will become apparent from the following description in conjunction with the attached drawings, in which:

FIGS. 6a through 6c are views illustrating torsional vibration detected from each rotational shaft wherein, FIG. 6a is a graph illustrating a piston stroke in a waveform, FIG. 6b is a graph illustrating torsional vibration of a crankshaft in a waveform, and FIG. 6c is a graph illustrating torsional vibration of a camshaft in a waveform.

DETAILED DESCRIPTION OF THE PREFERRED EMBODIMENTS

Preferred embodiments of the present invention will now be described in detail with reference to the accompanying drawings.

Figure 1:
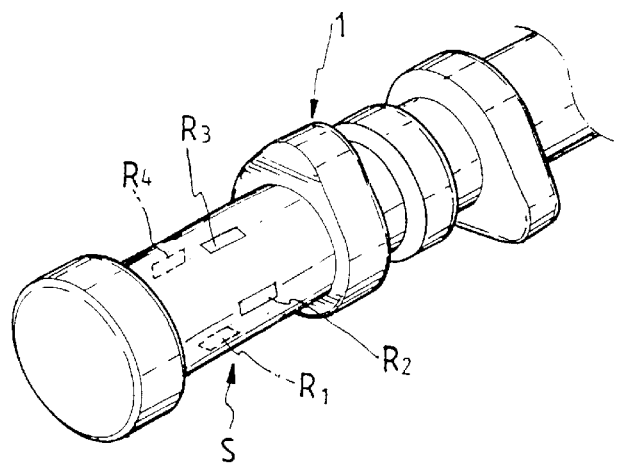
FIG. 1 is a perspective of a camshaft of a test engine according to a preferred embodiment of the present invention.

Referring first to FIG. 1, shown is a perspective view of a camshaft 1. A strain gauge S for measuring torsional distortion of the camshaft 1 is provided on the camshaft 1 at a location where torsional distortion of the camshaft 1 is most severe.

The strain gauge comprises first, second, third, and fourth resistors R1, R2, R3, and R4 provided equidistantly around a circumference of the camshaft 1, i.e., at every 90°.

Figure 2:
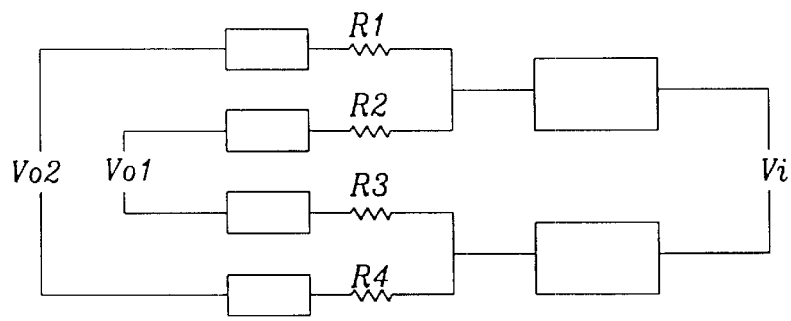
FIG. 2 is a schematic circuit diagram of a strain gauge shown in FIG. 1.

Referring to FIG. 2, the first and second resistors R1 and R2 are connected to one side of an input terminal Vi, and the third and fourth resistors R3 and R4 are connected to one side of another input terminal Vi. Further, the second and third resistors R2 and R3 are connected to a first output terminal Vo1 such that output of the second and third resistors R2 and R3 is transmitted thereto, and the first and fourth resistors R1 and R4 are connected to a second output terminal Vo2 such that output of the first and fourth resistors R1 and R4 is transmitted thereto. Such a connection is realized through a Wheatstone bridge 10 as shown in FIG. 3.

Figure 3:
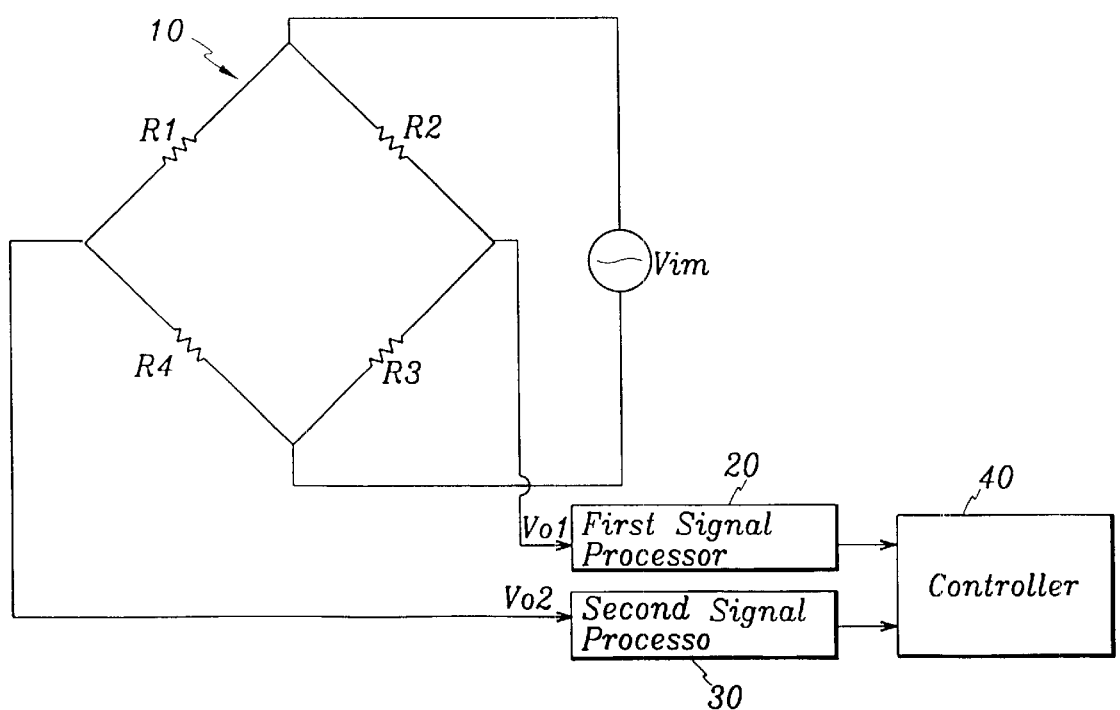
FIG. 3 is a schematic circuit diagram of a device for detecting a standard torque value according to signals transmitted from the strain gauge of FIG. 2.

In FIG. 3, the first output terminal Vo1 of the Wheatstone bridge 10 is connected to a first signal processor 20, and the second output terminal Vo2 is connected to a second signal processor 30. A controller 40 calculates the degree of distortion of the camshaft 1 by a deviation value computed by a calculation program which uses signals output from the first and second signal processors 20 and 30 such that a standard torque value, which causes camshaft distortion, can be obtained.

Figure 4:
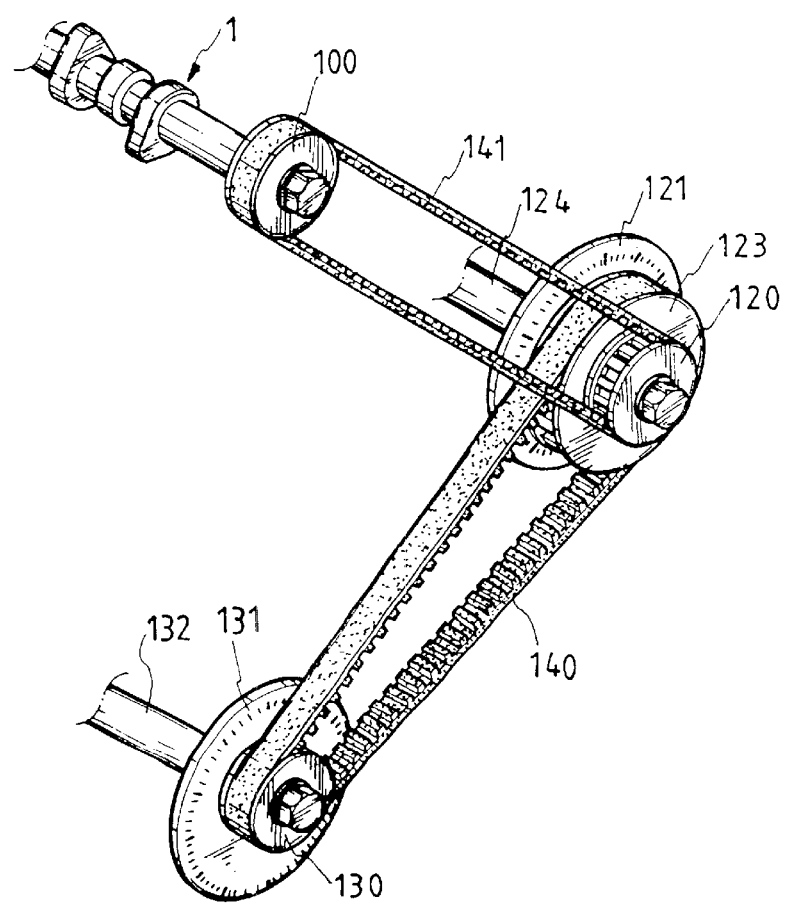
FIG. 4 is a schematic diagram of a test engine according to a preferred embodiment of the present invention.

Referring to FIG. 4, shown is a schematic diagram of a device for measuring strain deflection of a crankshaft and an injection pump shaft by analyzing the relation between timing belt tension and torque detected in the camshaft 1. As shown in the drawing, a first protractor 131 is provided on a sprocket 130 of a crankshaft 132. Since the test engine is selected from a diesel engine, there is further provided an injection pump shaft 124 having first and second sprockets 120 and 123, the injection pump shaft 124 increasing the pressure level of fuel being injected, such that strain deflection of each rotating shaft with respect to standard torque of the camshaft is detected. The second sprocket 123 of the injection pump shaft 124 is provided with a second protractor 121.

In the above, the sprocket 130 of the crankshaft 132 is connected to the second sprocket 123 by a first timing belt 140, while the sprocket 100 of the camshaft 1 is connected to the first sprocket 120 of the injection pump shaft by a second timing belt 141. However, in the case of a gasoline engine, the sprocket 100 may be directly connected to the sprocket 130 of the crankshaft 132.

Figure 5:
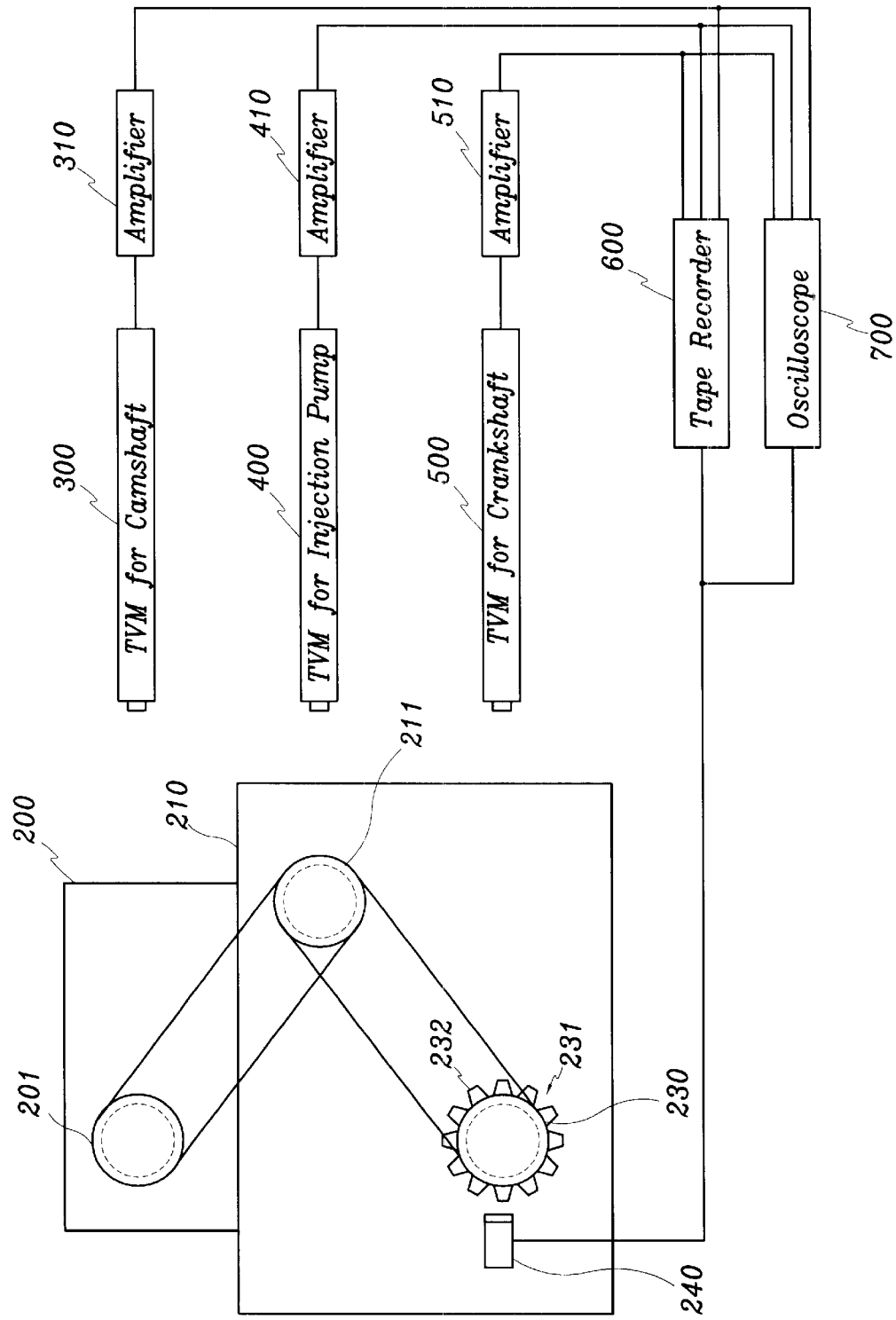
FIG. 5 is a block diagram of a system for measuring interference between valves operated by a camshaft and a piston by torsional vibration of each rotational shaft of an engine.

Referring now to FIG. 5, shown is a block diagram of a device for measuring strain of each rotating shaft by detecting torsional vibration of each rotating shaft.

As shown in the drawing, there is provided a camshaft 201 provided in a cylinder head 200, an injection pump shaft 211 mounted in a cylinder block 210, and a crankshaft 230.

A phosphor tape 232 excited by light is adhered to a sprocket 230 of a crankshaft 230. Torsional vibration meters (TVMs) 300, 400, and 500 are provided respectively corresponding to positions of the shafts 201, 211, and 230. There is further provided a crankshaft angle sensor 240 for detecting a crankshaft rotating angle, thereby detecting a position of a piston.

First, second, and third amplifiers 310, 410, and 510, which amplify the measured vibration signals to a predetermined level, are connected to the torsional vibration meters 300, 400, and 500, respectively. The amplified vibration signals are stored in a tape recorder 600, and output to an oscilloscope 700 which displays torsional vibration signals detected from each shaft and data related to the position of the crankshaft in a waveform manner.

The crankshaft angle sensor 240 detects the position of the piston by photo-interruption of peaks of gear teeth formed on the crankshaft sprocket 231. Further, the TVMs 300, 400, and 500 measure only the AC elements of torsional vibration of the rotating shafts excluding the DC elements generated by constant speed.

Data related to distortion, generated by the application of torque by inertia and power transmission, of each shaft is obtained as explained above by the two types of measuring devices, then interference between the piston and an intake/exhaust valve is measured as explained hereinbelow.

First, in a state where the resistors R1, R2, R3, and R4 are mounted to the camshaft 1, if the engine is run at a predetermined level of RPM, as force is applied to the camshaft 1 in only one direction by tension of the timing belt connected to the crankshaft and injection pump shaft, and inertia and torque of the rotating shafts, a predetermined amount of distortion results.

Here, as a predetermined amount of voltage Vin is applied to the strain gauges R1, R2, R3, and R4, provided equidistantly around the circumference of the camshaft 1, the level of voltage is changed when the camshaft 1 is distorted.

Changes in voltage output from the output terminals Vo1 and Vo2 of the strain gauges R1, R2, R3, and R4 are changed into signals that can be recognized by the control part 40 through the first and second signal processors 20 and 30. The controller 40 calculates the difference in voltage between what is output from the output terminals Vo1 and Vo2 using a program installed therein such that strain deflection of the camshaft 1 is calculated. Further, a standard torque value related to crankshaft distortion is calculated from the calculated deviation.

Referring to FIG. 4, after the engine is run and the standard torque value related to camshaft distortion is measured, in the test engine equipped with the protractors 131 and 121 on the crankshaft and injection pump sprockets 130 and 120, the camshaft 100 is fixed to prevent rotation using a tool such as a jig, and the crankshaft sprocket 130 is rotated using a tool such as a torque winch until a level of torque equal to the standard torque, applied to the camshaft sprocket 100, is obtained.

Accordingly, as the timing belts 140 and 141, which make a connection from the crankshaft sprocket 130 to the camshaft sprocket 100, are made of malleable material such as rubber or a chain, they either expand or contract during the torque transmission process.

If torque is forcibly applied to the crankshaft sprocket 130, the crankshaft sprocket 130 and the injection pump sprocket 120 are rotated. Here, the rotational deviation is measured by the protractors 131 and 121 provided on the sprockets 130 and 120. As the rotational deviation indicates that a gap between a TDC (top dead center) of the piston, and the intake/exhaust valve is different from a design value, interference between the valve and piston can be measured by analyzing a level of lift of the intake/exhaust valve.

A process in which the injection pump sprocket 120 is fixed and torque is applied to the crankshaft sprocket 130 is also performed, in addition to the above process of fixing the camshaft and applying torque, equal to that in a commercial engine, through the crankshaft sprocket 130 to measure deviation angle with regard to a rotational ratio such that distortion of the timing belts and shafts can also be measured.

The operation for measuring torsional vibration for each shaft will be described hereinafter with reference to FIG. 5.

When the test engine is run at a predetermined level of RPM, the injection pump shaft and the camshaft are rotated to a fixed rotational ratio by power transmitted through the crankshaft 230.

Here, resulting from stationary inertia and friction caused by mechanical meshing, force is generated at each shaft in a direction opposite that of the rotational direction. Accordingly, vibration is created by forces, i.e., expansion and contraction of the means transmitting drive power and load from driven ends of the shaft, used to work against this opposite rotational force.

The vibration occurring at each of the shafts is transmitted to the sprockets 201, 211, and 230. Here, a predetermined amount of light is emitted from each of the torsional vibration meters 300, 400, and 500, corresponding to the positions of the sprockets 201, 211, and 230, respectively. However, this light is reflected back to the TVMs 300, 400, and 500 by the reflective tape, shown by the dotted lines, provided on the outer circumferences of the sprockets 201, 211, and 230.

Figure 6A:
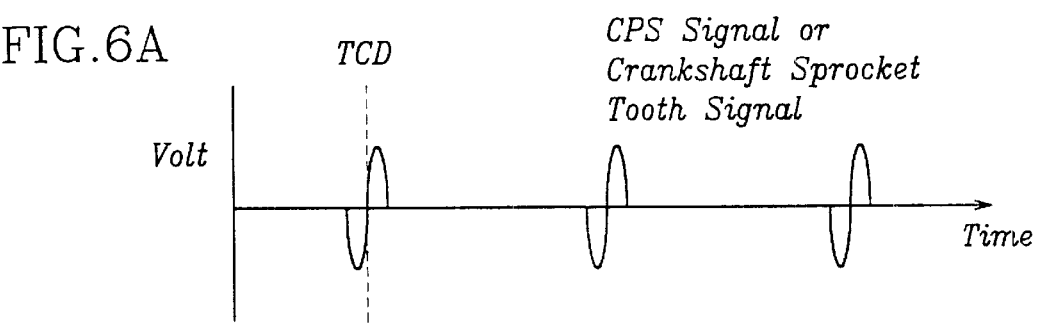
Figure 6B:
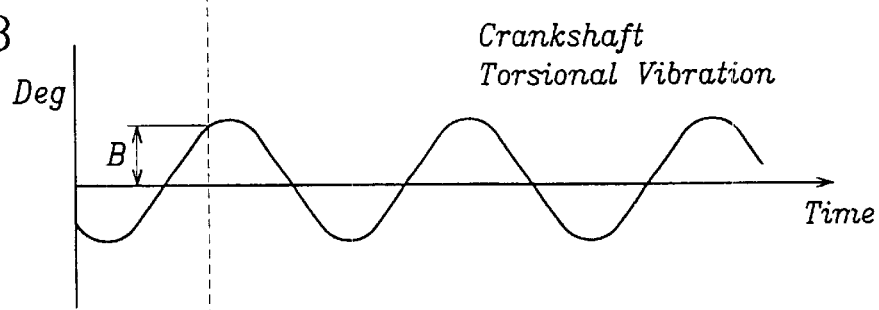
Figure 6C:
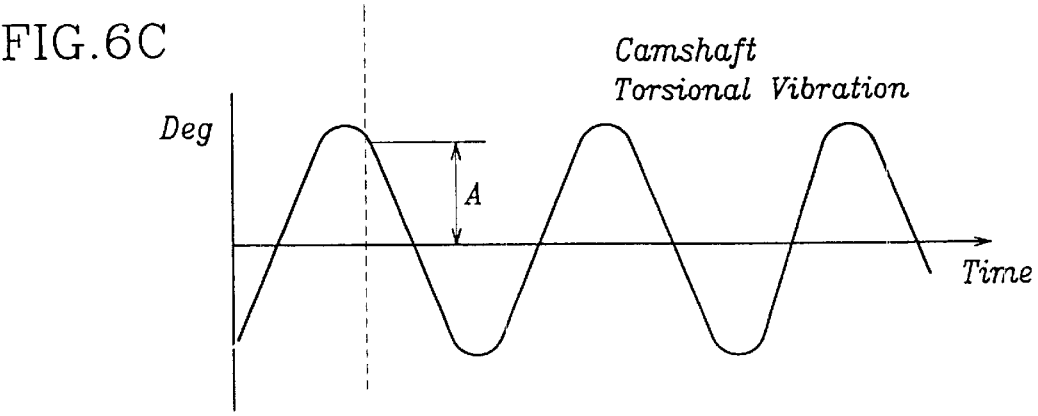

Here, each of the TVMs 300, 400, and 500 outputs characteristics of the vibration from the reflected light in an AC waveform, as shown in FIG. 6, which are amplified to predetermined levels by the amplifiers 310, 410, and 510. The amplified AC values are stored in the tape recorder 600 and, at the same time, input to the oscilloscope 700 to be displayed as AC component waveforms as shown in FIG. 6.

More in detail, for example, if an object is rotated with the constant speed of 6000 RPM, this becomes a DC element. Therefore, the output AC components in the above are varied between 5995 RPM and 6005 RPM. This variation in RPM is due to load and stationary inertia generated by dead weight force and mechanical meshing, energy loss, and other such factors. Here, as the +5 RPM is caused by vibration, the +5 RPM becomes AC components.

In the above state of measuring torsional vibration of each of the sprockets 201, 211, and 230, the crankshaft angle sensor 240 performs a photo interruption operation on the teeth of the crankshaft sprocket 230 such that the crankshaft angle is measured. Accordingly, information of the piston position is detected and this signal is stored in the tape recorder 600 and, simultaneously, is transmitted to the oscilloscope 700 to be expressed as a graph as shown in FIG. 6 indicating TDC (top dead center) information, and stroke and position of the piston.

Each waveform phase difference is considered through the graphs displayed on the oscilloscope, and from the TDC stroke of the crankshaft, the crankshaft vibration is, visually or using a program, compared to the camshaft vibration to measure camshaft distortion and the amount of valve lift.

In the above, the measuring of valve lift from a comparison between crankshaft and camshaft vibration is calculated using a value attained by subtracting crankshaft vibration level (B) from camshaft vibration level (A).

After the above is performed, interference between the intake/exhaust valve and the piston is measured. This will be described hereinafter.

Figure 7:
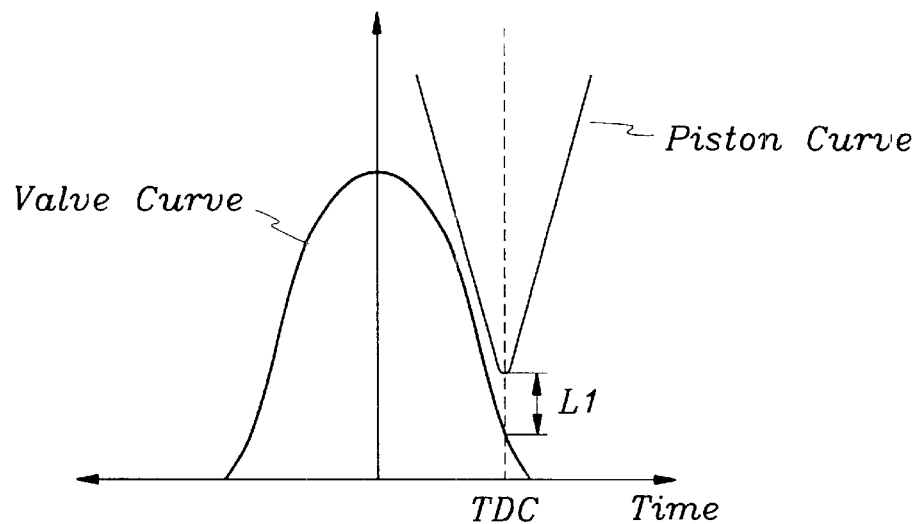
FIG. 7 is a graph illustrating valve timing in relation to piston movement.
Figure 8:
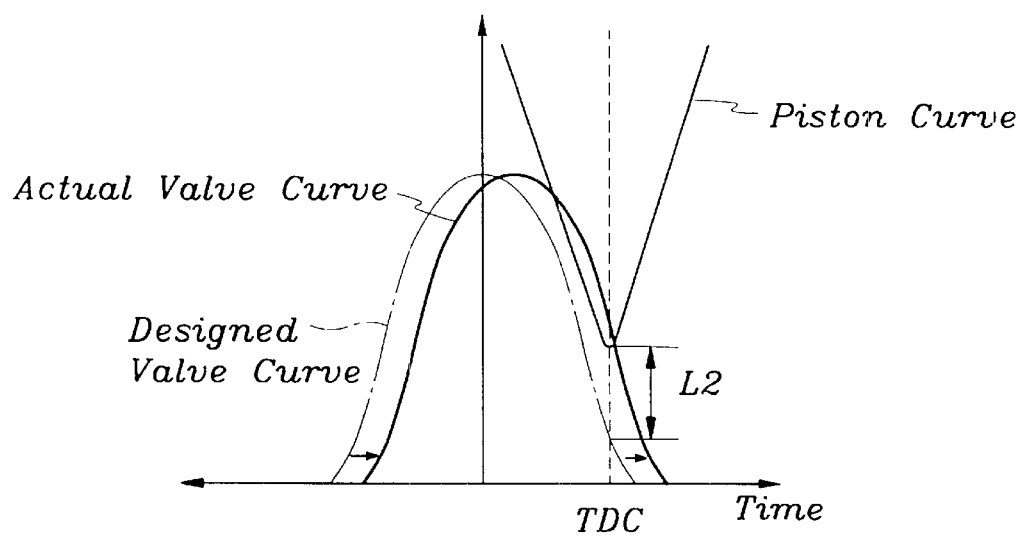
FIG. 8 is a graph illustrating valve timing, as designed and after undergoing distortion, in relation to piston movement.

As shown in FIG. 7, in the process of each piston undergoing reciprocating motion up to their TDCs, the stroke of the valve, opening and closing by the rotation of the camshaft, and that of the piston are set such that interference therebetween does not occur. Here, the interval L1 between the TDCs of the valve and piston is measured to set a standard value.

Next, if the actual interval between the intake/exhaust valve and the piston (measured by the standard torque compared to the angle deviation of each shaft and torque, measured through torsional vibration of each shaft, and belt tension and rigidity), and the interval of the intake/exhaust valve and the piston without interference therebetween are shown on a graph, the result is shown as shown in FIG. 9.

As shown in FIG. 9, there is a difference in valve lift between what it was designed to do and what actually happens, as shown with line ΔL, as a result of camshaft distortion occurring from various loads caused by tension and rigidity of the power transmission means and in the rotating process.

Further, when the valve and piston interval is compared from the piston TDC, the actual interval L2 between the valve and piston is larger than the design value interval L1. Accordingly, problems of camshaft distortion or tension and rigidity of the power transmission means can be detected.

Accordingly, steps can be taken in the design process, e.g., cylinder structure and shaft material changes, adjustment of valve timing, etc., such that interference between the valves and pistons does not occur.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method for measuring interference between a valve and a piston, comprising the steps of:

measuring a standard torque of a camshaft, related to camshaft distortion caused by engine RPM, through voltage detecting means;

measuring torsional distortion deviation of a crankshaft by fixing the camshaft and forcibly rotating the crankshaft by said standard torque value;

measuring vibration generated when the camshaft, the crankshaft, and the injection pump shaft are rotated, said measuring of vibration being performed using a torsional vibration meter and measuring a crankshaft rotational angle to detect a piston TDC position, both measurements being conducted at a predetermined level of engine RPM;

displaying piston and intake/exhaust valve movement on a graph at the piston TDC position after analyzing torsional distortion deviation and vibration of each of the camshaft and crankshaft; and determining whether there is interference between the intake/exhaust valve and the piston by comparing design values with that displayed on the graph.

2. The method of claim 1, wherein the voltage detecting means is comprised of a strain gauge.

3. The method of claim 1, wherein strain gauges are provided on the camshaft at locations where distortion from power transmission is most severe.

4. The method of claim 2, wherein strain gauges are provided on the camshaft at locations where distortion from power transmission is most severe.

5. The method of claim 1, wherein the torsional distortion deviation is derived from measuring a distortion angle through use of protractors provided on sprockets of the crankshaft and the injection pump shaft.

6. The method of claim 1, wherein the torsional distortion deviation is derived from measuring the torsional distortion deviation of the crankshaft by fixing an injection pump shaft mechanically coupled to both the camshaft and crankshaft, and forcibly rotating the crankshaft.

7. A system for measuring interference between a valve and a piston which comprises:

a camshaft, crankshaft and injection pump shaft connected through power transmission means, the crankshaft containing a sprocket, a crankshaft fist angle detecting means for detecting the crankshaft rotational angle from the crankshaft sprocket, an injection pump shaft second angle detecting means for detecting the injection pump shaft rotational angle, said first and second angle detecting means measuring the torsional distortion deviation of the crankshaft and injection pump shaft when torque, equaling a camshaft distortion torque measuring with the in a fixed state, is given either to the crankshaft or the injection pump shaft, said camshaft distortion torque being measured by a strain gauge provided at a location in the camshaft where distortion caused by torque from power transmission is most severe, reflective tape adhered to an outside circumference of sprockets provided on each shaft, the reflective tape being made of a material which reflects light;

torsional vibration detecting means for emitting light toward each sprocket of each rotating shaft and receiving the reflection of this light, reflected by the reflective tape, and for outputting the vibration of each shaft as an AC component signal;

amplifying means for amplifying said output AC component signal;

recording means for storing, in a predetermined format, piston position information and AC component signals related to the vibration of each shaft; and waveform display means for graphically displaying the information of the piston position and the AC component signal relating to vibration of each shaft;

wherein said strain gauge comprises four resistors connected to each other through a Wheatstone bridge having first and second output terminals, and the system further comprises, a first signal processor for processing signals output from the first output terminal of the Wheatstone bridge;

a second signal processor for processing signals output from the second output terminal of the Wheatstone bridge; and a controller for analyzing signals from the first and second output terminals to determine camshaft distortion, and calculating standard torque from the determined camshaft distortion value and outputting the same; and wherein the crankshaft angle detecting means performs a photo interrupting process on gear teeth of the crankshaft sprocket.

8. The system of claim 7, wherein said strain gauge comprises four resistors connected to each other through a Wheatstone bridge having first and second output terminals, and the system further comprising:

a first signal processor for processing signals output from the first output terminal of the Wheatstone bridge;

a second signal processor for processing signals output from the second output terminal of the Wheatstone bridge; and a controller for analyzing signals from the first and second output terminals to determine camshaft distortion, and calculating standard torque from the determined camshaft distortion value and outputting the same.

9. The system of claim 7, wherein the crankshaft angle detecting means performs a photo interrupting process on gear teeth of the crankshaft sprocket.

* * * * *